United States Patent [19]

Grathoff

[11] Patent Number: 4,907,932

[45] Date of Patent: Mar. 13, 1990

[54] CONTINUOUS BULK MATERIAL CONVEYER

[75] Inventor: Hartmut Grathoff, Wendelstein, Fed. Rep. of Germany

[73] Assignee: MAN Gutehoffnungshütte GmbH, Oberhausen, Fed. Rep. of Germany

[21] Appl. No.: 303,546

[22] Filed: Jan. 27, 1989

[30] Foreign Application Priority Data

Jan. 28, 1988 [DE] Fed. Rep. of Germany ....... 3802420

[51] Int. Cl.$^4$ .............................................. B65G 67/60
[52] U.S. Cl. .................................. 414/140.9; 198/515
[58] Field of Search ................................ 198/515, 518; 414/140.9, 141.3, 141.4, 141.6, 142.2

[56] References Cited

U.S. PATENT DOCUMENTS 3,268,053 8/1966 Llewellyn ............................ 198/515
4,230,221 10/1980 Beresinsky ........................... 198/513

FOREIGN PATENT DOCUMENTS 3447498 7/1986 Fed. Rep. of Germany .
226421 10/1986 Japan ................... 414/140.9

Primary Examiner—Robert J. Spar
Assistant Examiner—Janice Krizek
Attorney, Agent, or Firm—Robert W. Becker & Associates

[57] ABSTRACT

A movable continuous bulk material conveyer, especially for unloading ships. A steep-rise conveyor is provided that comprises a conveyor belt and a cover belt. The bulk material is thrown by two casting reels into the lower gap between the conveyor belt and the cover belt. Since during the meander-like removal of material from the hold of a ship, the position of the casting reels and the steep-rise conveyer relative to one another constantly changes, the shafts of the casting reels are pivotably connected via a quadrilateral articulation with the lower guide pulleys of the steep-rise conveyor, and are controlled by hydraulic pistons from a computer in such a way that the casting reels always pick up a constant stream of bulk material and throw this material in the direction of the angle bisector of the gap of the steep-rise conveyor.

4 Claims, 2 Drawing Sheets $h_1 \approx h_2$
$h_1 + h_2 = h$

CONTINUOUS BULK MATERIAL CONVEYER

BACKGROUND OF THE INVENTION

The present invention relates to a movable continuous conveyer for removing bulk material, especially for unloading ships, and includes a boom that has a conveyer belt, is pivotably connected to a movable support structure, and is adjustable in height via a luffing mechanism in the form of a linear drive. The continuous conveyer also includes a steep-rise conveyer that is suspended on the free end of the boom, is pivotable in a vertical plane via a linear drive about a horizontal axis, and has a cover belt conveyer system, the end regions of the belts of which are guided about guide pulleys or rollers, and the conveyer belt of which is preferably the conveyer belt of the boom. Furthermore included is a material-receiving part for the receiving region of the steep-rise conveyer, with the material-receiving part including two casting reels that can be driven in opposite directions and are mounted in a support structure. Possibly also included is a compensating mechanism for the lengthening or shortening of the conveyer belt of the cover belt conveyer system.

A bulk material conveyer of this general type is disclosed, for example, in German Pat. No. 34 47 498. However, the casting reels of this known conveyer are disposed in such a way that they cannot be adjusted either relative to one another or relative to the support structure of the steep-rise conveyer.

It is therefore an object of the present invention to provide a continuous conveyer of the aforementioned general type with which approximately equal quantities of bulk material can be picked up over the entire removal region by each casting reel during the movement of the steep-rise conveyer transversely through the ship's hold or the like, with which a sufficiently well concentrated quantity of bulk material is continuously thrown into the entry or receiving region of the cover belt conveyer system, and with which the material-receiving part is moved along a line of constant height during the movement transversely through the ship's hold or the like.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
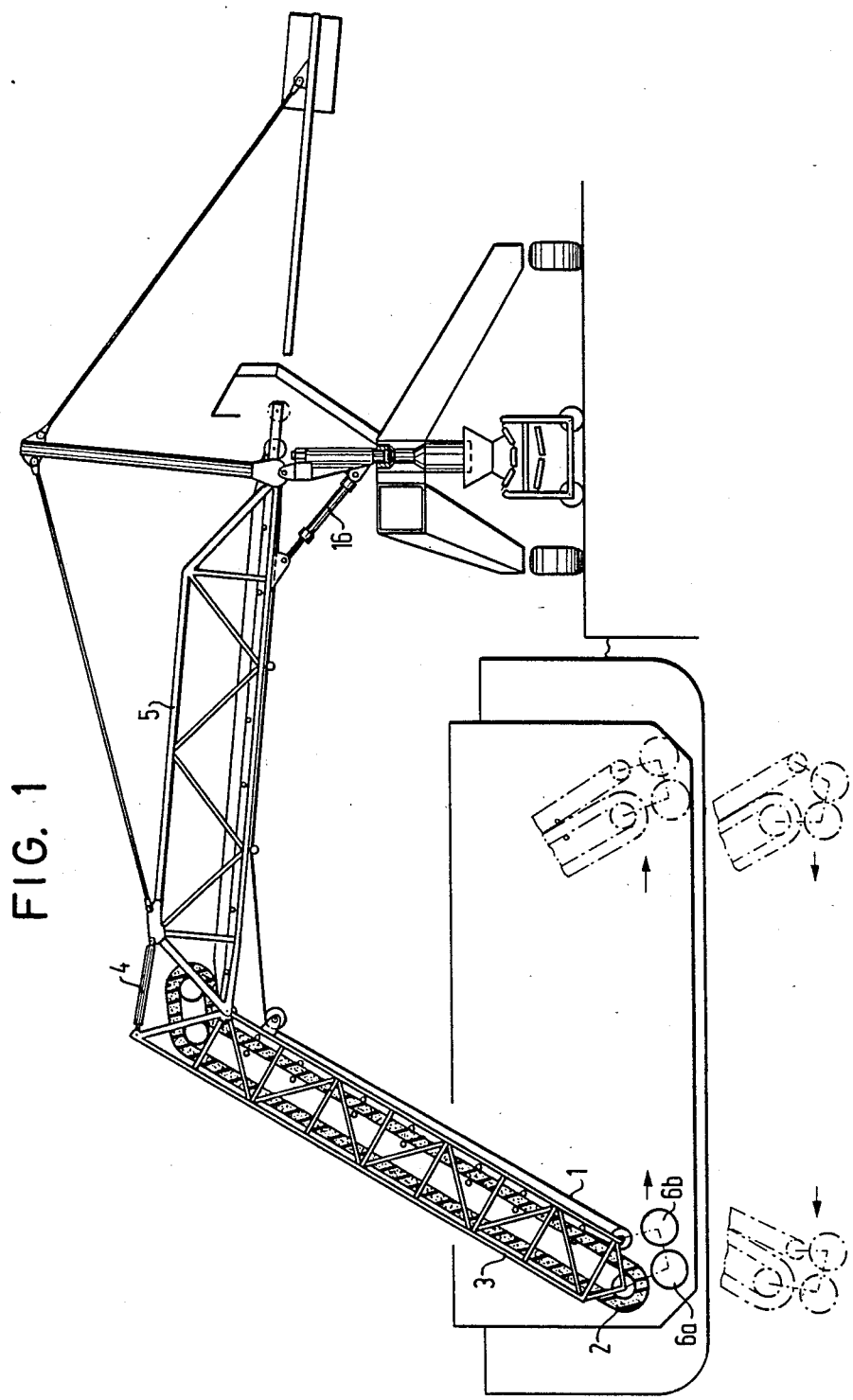
FIG. 1 is a side view of one exemplary embodiment of the inventive continuous conveyer for use as a ship unloader.
Figure 2:
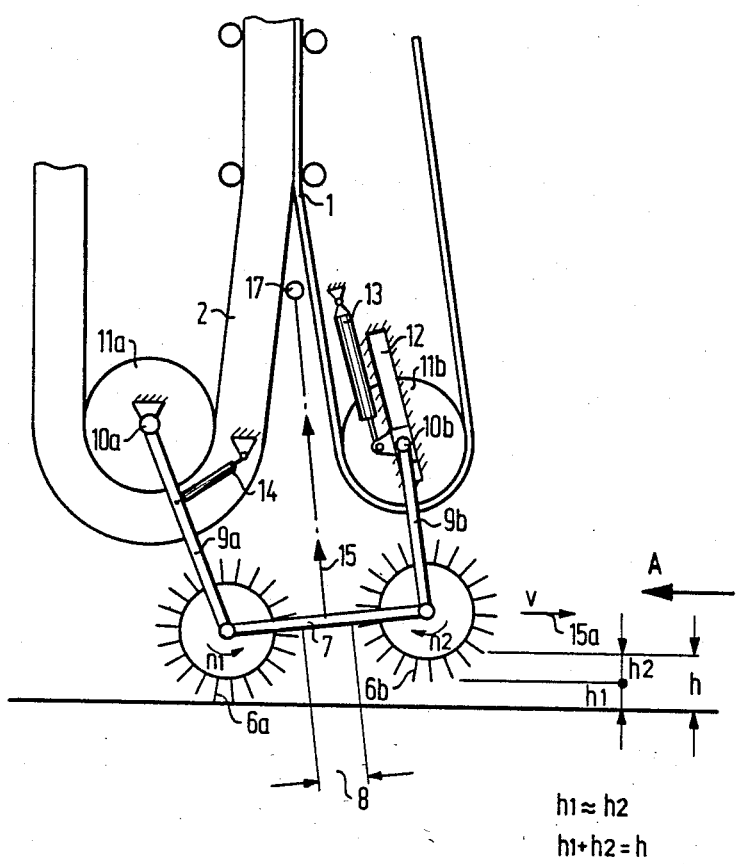
FIG. 2 is a detailed side view of the material-receiving part of the conveyer of FIG. 1.
Figure 3:
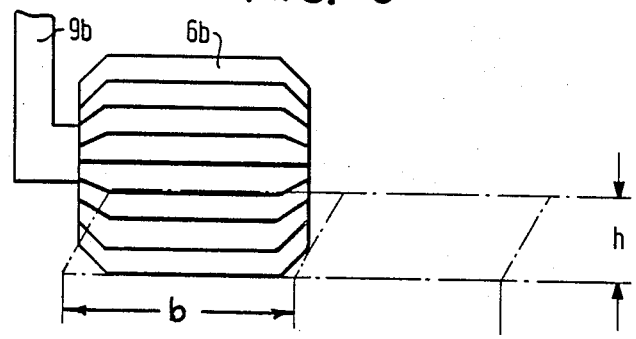
FIG. 3 is a view of the material-receiving part taken in the direction of arrow A in FIG. 2.

The continuous bulk material conveyer of the present invention is characterized primarily in that: the support structure for the casting reels includes three control linkage groupings, a first one of which serves for an articulated interconnection of the casting reels, and the other two of which serve for an articulated connection of the casting reels with shafts of adjacent lower ones of the guide means for the belts of the cover belt conveyer system; one of the shafts of the lower guide means for the belts is adapted to be shiftable in height in further guide means or on a linear support via a linear drive; a further linear drive is provided for adjustment of the quadrilateral articulation defined by the three control linkage groupings and the shafts of the lower guide means for the belts; during a pendulum movement of the steep-rise conveyer transversely through, for example, the hold of a ship, a respectively leading one of the casting reels is disposed higher than the other casting reel such that both casting reels pick up at least nearly the same amount of material; a first control mechanism is provided for adjusting the linear drive of the luffing mechanism as a function of deflection of the steep-rise conveyer out of a vertical position, in such a way that the course of movement of the casting reels across the material is horizontal; and a second control mechanism is provided for adjusting the linear drives for the guide means shafts and for the quadrilateral articulation for adjusting the latter and for shifting the height of the leading casting reel, as a function of deflection of the steep-rise conveyer out of a vertical position, in such a way that during the pendulum movement of the steep-rise conveyer, the casting reels always assume the same position relative, for example, to the ship, and a stream of bulk material picked up by the casting reels is always directed at least nearly perpendicular to the first one of the control linkage groupings that interconnects the casting reels and is directed into the receiving region of the steep-rise conveyer.

Further specific features of the present invention will be described in detail subsequently.

DESCRIPTION OF PREFERRED EMBODIMENTS

Referring now to the drawings in detail, the ship unloader, in a manner generally known per se, includes a support structure that is movable on the wharf on wheels, a pivotable superstructure that is supported via a turning mechanism on the support structure, a conveyer boom that can be raised and lowered by being pivoted about a horizontal axis, an inclined or steep-rise conveyer that conveys the bulk material upwardly and is pivotable on the boom about a horizontal axis that is oriented parallel to the longitudinal axis of the ship, and a material-receiving part that takes up the bulk material and throws it against the higher situated receiving region 17 of the steep-rise conveyer.

The steep-rise conveyer comprises a cover belt conveyer, which is preferably embodied as a foam material belt conveyer, and includes a conveyer belt 1 that is driven in a clockwise direction, a foam material belt, the cover belt 2, that rotates at the same speed in the opposite direction, and a tunnel-like support structure 3. By means of a linear drive 4, the support structure 3 can be swung in a pendulum-like manner by about ±30° out of the vertical central position.

The conveyer belt 1 is preferably simultaneously the conveyer belt in the boom 5. However, the conveyer belt in the boom 5 can also be an independent belt that is separate from the conveyer belt 1.

The material-receiving part, which generates an upwardly rising stream of bulk material, is located ahead of the steep-rise conveyer. This material-receiving part comprises two oppositely rotating, motor driveable throwing or casting drums or reels 6a, 6b, or casting wheels. The casting reels 6a, 6b are essentially identical, and are pivotably interconnected via a rod 7, linkage means, or similar coupling elements. The rod 7 can be of fixed length; however, it is expedient for the length of the rod 7 to be variable so that the gap 8 between the casting reels 6a and 6b can be reduced or increased.

The casting reels 6a and 6b are pivotably connected via rigid rods 9a and 9b with the axes of rotation 10a and 10b of the guide or deflection pulleys 11a and 11b. The length of the rods 9a and 9b is such that on the one hand damage to the foam material belt 2 and the conveyer belt 1 due to direct contact with the casting reels 6a and 6b is avoided, yet on the other hand as small a distance as possible between the casting reels and the material-receiving region 17 of the steep-rise conveyer results.

The axis or shaft 10b of the guide pulley 11b is guided in such a way that its height can be shifted, for example in a guide means 12 or on a linear support, and is adjustable via a linear drive 13.

The quadrilateral articulation or linkage defined by the axes of rotation 10a, 10b of the guide pulleys 11a, 11b and the axes of rotation of the casting reels 6a, 6b are adjusted by a linear drive 14 that is disposed between the rod 9a and the support structure 3.

The leading casting reel 6b, as seen in the direction 15a of movement of removing bulk material, is, regardless of the angular position of the steep-rise conveyer at any given time, disposed higher by a uniform amount $h_1$ measured in a vertical direction. The bulk material strip picked up by the casting reel 6a has the height $h_1$. The casting reels are immersed into the bulk material to such an extent that the bulk material strip picked up by the casting reel 6b has the height $h_2$, with $h_1$ and $h_2$ being approximately the same, so that the two casting reels 6a and 6b pick up approximately the same amount of material.

As indicated by the arrows n1 and n2 the casting reels 6a and 6b rotate in opposite directions, preferably rotating at approximately the same speed. In such a case, the stream of bulk material generated by the casting reels 6a and 6b would have approximately the direction 15.

(In the ideal situation, the stream of bulk material is delimited by those two tangents to the crown lines of the casting reels that are directed perpendicular to the connecting line between the two casting reel shafts). Expressed differently, the direction 15 is also the central perpendicular to the rod 7. The gap 8 is to be selected in such a way that the product of the stream velocity, the casting reel width, and the gap 8 results in the quantity of the bulk material that is desired to be conveyed. The conveyed stream of bulk material is best concentrated in this situation.

If the conveyer belt in the boom 5 and the conveyer belt 1 are an endless rotating belt, the guide pulley that serves to guide the end of the conveyer belt 1 on the land side is guided in guide means or on a linear support and is acted upon by a tensioning mechanism so that the conveyer belt 1 is kept taut despite the movements of the guide pulley 11b and despite the changes in length that result from the angular movements between the steep-rise conveyer and the boom. The tensioning mechanism can be a hydraulic or pressurized gas cylinder that is supplied via a centrifugal pump with pressure medium that is always at approximately the same pressure. The tensioning mechanism can, for example, also be a pretensioned spring that has a very flat spring characteristic and that has as nearly a uniform force as possible throughout the spring deflection.

The boom 5 can be moved by about ±15% out of the horizontal position upwardly or downwardly about a horizontal axis that is disposed parallel to the direction of travel of the ship unloader (i.e. parallel to the longitudinal central axis of the ship). This is achieved via a linear drive 16 that is disposed between the boom 5 and the superstructure of the ship unloader.

The superstructure is pivotable about approximately 90° about a vertical axis in order to pivot out of the inoperative position, in which the boom 5 is pivoted in the direction of travel of the ship unloader, into the operative position and vice versa. In operation, the superstructure (including the boom) is pivoted a few degrees about a perpendicular to the direction of travel of the ship unloader, which is parallel to the edge of the wharf, as will be described in detail subsequently. The pivoting movement is carried out by a known linear drive.

The linear drive 4, as a function of the inclination or deflection of the steep-rise conveyer, is driven out of the perpendicular central position by an appropriate, first, control mechanism in such a way that the casting reels 6a, 6b are each moved along a line having a uniform height. The mechanism includes a theoretical value/actual value comparison device, with the theoretical values being given and the actual values being determined by sensors that measure the path of the movable part of the linear drive 4. The output signal of this comparison device serves as a control signal for the drive motor of the linear drive 4 or of the control valve of the hydraulic cylinder that forms the linear drive.

The linear drives 13, 14, as a function of the inclination or deflection of the steep-rise conveyer, are driven out of the perpendicular central position by a second control mechanism in such a way that during the pendulum movement in the transverse direction through the hold of the ship, the casting reels 6a and 6b always have the same position relative to the ship. (The position of the casting reels relative to the steep-rise conveyer consequently changes continuously). In addition, as a function of the inclination or deflection of the steep-rise conveyer, the linear drives 13, 14 are driven out of the perpendicular central position in such a way that the stream of bulk material generated by the casting reels 6a and 6b is continuously directed into the receiving region 17 of the steep-rise conveyer. This latter control can, for example, be effected by optical sensors and a control system, with the direction of the stream of bulk material being constantly detected and being continuously corrected in the direction toward the receiving region of the steep-rise conveyer.

However, it is more advantageous to determine the course of the casting reels 6a and 6b empirically or by computation, and to input into a computer the operation of the two cylinder paths of the linear drives 13, 14 as a function of the steep-rise conveyer as the program that provides the theoretical values. These theoretical values are compared with the corresponding actual values in a theoretical value/actual value comparison device, with the output signal of this comparison device being used to control the motors of the linear drives 13 and 14. To determine the actual value signals, the path of the movable parts of the linear drives 13 and 14 are detected by sensors.

The casting reels 6a and 6b move in the direction 15a at an advancement speed v. During their movement transverse to the hold of the ship, the casting reels pick up a bulk material strip having a height h and a width b, with this width corresponding approximately to the width of the casting reels 6a, 6b. The quantity of material picked up and conveyed, namely $h \times b \times v$, is generally held constant by an automatic control, whereby preferably the values h and v are kept constant. However, if by way of exception, for example when the bottom of the ship's hold is emptied of residual material, the height of the bulk material strip or layer is lower, the automatic control can keep the quantity of the material conveyed constant by appropriately increasing the advancement speed v.

Removing the bulk material in strips results in a uniform taking-up of the bulk material independent of the flow characteristics thereof. After a strip has been removed, the ship unloader can be advanced by the width of one strip. Subsequently, the height of the casting reels 6a and 6b are adjusted so that also during the return movement the leading casting reel will be higher.

However, it is also possible during the pendulum movement of the steep-rise conveyer transversely through the hold of the ship to constantly move the ship unloader very slowly parallel to the longitudinal axis of the ship. In order in this case to obtain straight strips of the bulk material that is to be removed perpendicular to the direction of travel of the ship unloader, the driving movement of the ship unloader must be compensated for by a pivoting movement, of only a few degrees, of the superstructure of the ship unloader. For this purpose, the driving mechanism of the ship unloader, via a third control mechanism, drives the pivot mechanism in the required manner. The course covered by the ship unloader is determined by sensors and, after appropriate adaptation to the pivot angle, is supplied as a control signal to the motor of the pivot mechanism.

The linear drives 4, 13, 14, and 16 and the linear drive for the pivot mechanism of the superstructure are preferably hydraulic piston/cylinder units that each have one directly attached control valve and one built in or laterally attached displacement gauge and a dynamometer.

The material-receiving part moves along a straight horizontal line that is disposed in the direction of the width of the ship, i.e. transverse to the direction of travel of the ship unloader. This line is generated by simultaneous swinging of the steep-rise conveyer, luffing or whipping of the boom, slight pivoting of the superstructure, as well as slow travel of the ship unloader.

With the exception of the basic adjustments that are to be undertaken by the operator of the apparatus, the ship unloader operates fully automatically; this can be achieved by the use of an electronic computer. Control is similar to that of an "intelligent" robot.

All of the hydraulic cylinders (piston/cylinder units) have course sensors, as a result of which the position of the apparatus at any given time, and all of the speeds are transmitted to the computer.

The movements of the ship unloader are such that the ship's cargo is removed in layers and each layer is removed in strips, with the strips being disposed transverse to the longitudinal axis of the ship. In so doing, the material-receiving part carries out a meandering movement along a horizontal plane.

It should be noted that the inventive continuous bulk material conveyer can be used not only for unloading ships, but also, for example, for reducing the size or removing piles of stored bulk material.

The present invention is, of course, in no way restricted to the specific disclosure of the specification and drawings, but also encompasses any modifications within the scope of the appended claims.

What I claim is:

1. In a movable continuous conveyer for removing bulk material, especially for unloading ships, including a boom that has a conveyer belt, is pivotably connected to a movable support structure, and is adjustable in height via a luffing mechanism in the form of a first linear drive, also including a steep-rise conveyer system with a conveyer belt for unloading bulk material that is suspended on the free end of said boom, is pivotable in a vertical plane via a second linear drive about a horizontal axis, and has a cover belt conveyer, the end regions of the belts of the steep-rise conveyer system are guided about guide means, further including a material-receiving part for a receiving region of said steep-rise conveyer system, with said material-receiving part including two casting reels that can be driven in opposite directions and are mounted in a support structure, the improvement wherein:

said support structure for said casting reels includes three control linkage groupings, a first one of which serves for an articulated interconnection of said casting reels, and the other two of which serve for an articulated connection of said casting reels with shafts of adjacent lower ones of said guide means for said belts of said steep-rise conveyer system;

one of said shafts of said lower guide means is adapted to be shiftable in height in further guide means via a third linear drive;

a fourth linear drive is provided for adjustment of the quadrilateral articulation defined by said three control linkage groupings and said shafts of said lower guide means for said belts of said steep-rise conveyer system;

during a pendulum movement of said steep-rise conveyer system transversely through, for example, the hold of a ship, a respectively leading one of said casting reels is disposed higher than the other casting reel such that both casting reels pick up at least nearly the same amount of material;

a first control mechanism is provided for adjusting said second linear drive of said luffing mechanism, as a function of deflection of said steep-rise conveyer system out of a vertical position, in such a way that the course of movement of said casting reels across said bulk material is horizontal; and a second control mechanism is provided for adjusting said third and fourth linear drives for adjusting said quadrilateral articulation and for shifting the height of the leading casting reel, as a function of deflection of said steep-rise conveyer system out of a vertical position, in such a way that during said pendulum movement of said steep-rise conveyer system, said casting reels always assume the same position relative, for example, to said ship, and a stream of bulk material picked up by said casting reels is always directed at least nearly perpendicular to said first one of said three control linkage groupings that interconnects said casting reels and is directed into said receiving region of said steep-rise conveyer system.

2. A bulk material conveyer according to claim 1, which is adapted during said pendulum movement of said steep-rise conveyer system transversely through, for example, the hold of a ship to at the same time move slowly in the longitudinal direction of said ship, and which includes: a substructure that is provided with a travel mechanism; a superstructure that is supported on said substructure and carries said boom and said steep-rise conveyer system with said material-receiving part; a pivot mechanism for effecting pivoting of said superstructure about a vertical axis; and a third control mechanism via which said travel mechanism controls said pivot mechanism in such a way that travel movement is compensated for by pivot movement such that said support structure along with said casting reels that are mounted therein move along a straight line in the lateral direction of said ship.

3. A bulk material conveyer according to claim 2, in which said first, second, and third control mechanisms are a computer which is provided with theoretical values in the form of a program, and to which actual values are conveyed from path sensors of said third and fourth linear drives.

4. A bulk material conveyer according to claim 3, in which the theoretical values of the position-dependent forces of said third and fourth linear drives are supplied to said computer, and which includes force sensors at said third and fourth linear drives for continuously detecting, as a function of position, the actual values of the forces at these linear drives, with these actual force values being compared with said theoretical values such that when prescribed differences between these values are exceeded, warnings, movement reversals, and/or shutdowns are triggered.

* * * * *